(12) United States Patent
Liu et al.

(10) Patent No.: US 11,358,135 B2
(45) Date of Patent: Jun. 14, 2022

(54) METHOD FOR PREPARING HYDROCRACKING CATALYST

(71) Applicants: SINOCHEM CORPORATION, Beijing (CN); SINOCHEM QUANZHOU PETROCHEMICAL CO., LTD, Fujian (CN); SINOCHEM QUANZHOU ENERGY TECHNOLOGY CO. LTD, Fujian (CN)

(72) Inventors: Changkun Liu, Fujian (CN); Wenqing Fan, Fujian (CN); Jintian Wu, Fujian (CN); Li Zhang, Fujian (CN)

(73) Assignees: SINOCHEM ENERGY CO., LTD., Beijing (CN); SINOCHEM QUANZHOU PETROCHEMICAL CO., LTD., Fujian (CN); SINOCHEM QUANZHOU ENERGY TECHNOLOGY CO. LTD, Fujian (CN)

(*) Notice: Subject to any disclaimer, the term of this patent is extended or adjusted under 35 U.S.C. 154(b) by 75 days.

(21) Appl. No.: 17/059,475

(22) PCT Filed: Oct. 11, 2018

(86) PCT No.: PCT/CN2018/109793
§ 371 (c)(1),
(2) Date: Nov. 30, 2020

(87) PCT Pub. No.: WO2019/233009
PCT Pub. Date: Dec. 12, 2019

(65) Prior Publication Data
US 2021/0205801 A1    Jul. 8, 2021

(30) Foreign Application Priority Data
Jun. 4, 2018 (CN) .......... 201810565360.4

(51) Int. Cl.
*B01J 35/00* (2006.01)
*B01J 23/28* (2006.01)
*B01J 23/755* (2006.01)
*B01J 37/02* (2006.01)
*C10G 47/20* (2006.01)
*B01J 21/12* (2006.01)
*B01J 21/16* (2006.01)
*B01J 29/16* (2006.01)

(52) U.S. Cl.
CPC .......... *B01J 35/0006* (2013.01); *B01J 23/28* (2013.01); *B01J 23/755* (2013.01); *B01J 37/0207* (2013.01); *B01J 37/0236* (2013.01); *C10G 47/20* (2013.01); *B01J 21/12* (2013.01); *B01J 21/16* (2013.01); *B01J 29/166* (2013.01)

(58) Field of Classification Search
CPC ............ B01J 21/04; B01J 21/12; B01J 21/16; B01J 23/28; B01J 23/755; B01J 23/888; B01J 29/084; B01J 29/146; B01J 29/166; B01J 35/0006; B01J 35/002; B01J 37/0009; B01J 37/0018; B01J 37/0036; B01J 37/0203; B01J 37/0207; B01J 37/0209; B01J 37/0236; B01J 2229/20; B01J 2229/32; B01J 2229/37; B01J 2229/186

See application file for complete search history.

(56) References Cited

U.S. PATENT DOCUMENTS 4,360,449 A * 11/1982 Oberlander ............... C01F 7/02
423/628

OTHER PUBLICATIONS

Vieira Coelho, A.C. et al. (2003) Revista Materia, 13(2), 329-341.*

* cited by examiner

*Primary Examiner* — Brian A McCaig

(57) ABSTRACT

This invention discloses a preparation method of a hydrocracking catalyst. According to the method, a new functional group is modified through chemical bonds on the surface of a traditionally prepared inorganic carrier, and a VIB group metal element and a VIIIB metal element are then loaded on the carrier to prepare the hydrocracking catalyst. The hydrocracking catalyst prepared according to the invention has a higher diesel liquid yield.

7 Claims, No Drawings

METHOD FOR PREPARING HYDROCRACKING CATALYST

BACKGROUND OF THE INVENTION

1. Technical Field

The invention specifically relates to a preparation method of a hydrocracking catalyst.

2. Description of Related Art

The hydrocracking process is a refining process that converts high-boiling feedstocks into low-boiling naphtha and diesel fractions. Compared with catalytic cracking, the hydrocracking process is featured with high raw material adaptability, high yield of diesel fractions, and high quality, but with a relatively low octanes number of naphtha. As society's demand for clean transportation fuel oil continues to increase, the hydrocracking process has become one of the core processes in modern refineries.

The hydrocracking catalyst is the core of the entire hydrocracking process. It usually includes dual functional centers: one is an acidic center, which is provided by a carrier and basically determines the activity of the catalyst. In the development of hydrocracking catalysts, the acidic components have adopted halogenated (chlorinated or fluorinated) alumina, amorphous silica alumina, molecular sieves and other materials. Since the 1970s, with the development of molecular sieve preparation technology, the silica-alumina molecular sieve has gradually become the mainstream component of acid centers in hydrocracking catalysts due to its clear structure and adjustable acidity. The second is a metal center, which plays a role of hydrogenation/dehydrogenation in the reaction process, provides reaction materials for the acid center, and saturates the acid center products in time to prevent deep cracking. The metal center is generally composed of VIB metal or VIB-VIIIB binary metal system and provides real hydrogenation/dehydrogenation activity in the form of sulfide. The acid center is closely integrated with the hydrogenation/dehydrogenation center, and the coordination of the acid center and the the hydrogenation/dehydrogenation center is the key to the successful operation of a hydrocracking catalyst.

In order to meet society's increasing demand for clean transportation fuel oil, it is required to make full use of high-boiling raw materials in the hydrocracking process to produce more naphtha and diesel products, and reduce the production of low-value gaseous products (C1-C4). Moreover, in order to reduce production and operation costs, industrial production hopes to use higher-activity catalysts to lower the reaction temperature. Specific to the catalyst design, it is expected to simultaneously improve the performance of the acid center and the metal center of the catalyst: the performance of the acid center can be improved by increasing the acid strength or dosage of acidic materials (such as molecular sieves); however, due to the limitation by the effective specific surface area provided by the carrier and the characteristics of the metal itself, the performance of the metal center cannot be improved simply by increasing its dosage. Therefore, how to improve the performance of the metal center has always been a hot topic in this field.

Inorganic oxides (such as alumina) have a large number of hydroxyl groups on the surface. The types of hydroxyl groups can be divided into five types according to the coordination environment of aluminum atoms (Reference: Catal Rev. Sci. Eng. 17(1), 31-70, 1978). The formation of Al—O-M chemical bonds by these hydroxyl groups through condensation is the key reason for the strong interaction between the VIB metal and the alumina carrier. The invention carried out surface modification on the inorganic oxide carrier, and replaces all or part of the strong hydroxyl groups on the surface with other functional groups to form a weak interaction with the VI B metal, and even directly participate in the vulcanization of the VI B metal oxide, the interaction between a transition metal and the surface of the inorganic carrier is thereby substantially changed, which is beneficial to the full presulfurization of the transition metal oxide, thereby exerting the best hydrogenation/dehydrogenation performance in the hydrocracking reaction.

BRIEF SUMMARY OF THE INVENTION

The objective of the invention is to provide a preparation method of a hydrocracking catalyst, and the obtained hydrocracking catalyst has a higher diesel liquid yield.

In order to achieve the above objective, the invention adopts the following technical solution:

A preparation method of a hydrocracking catalyst, comprising the following Steps:

1) fully mixing pseudo-boehmite, amorphous silica alumina and a molecular sieve in a certain proportion, adding a certain amount of acid solution, kneading for 2-60 minutes, and then extruding and molding into stripes; drying the stripes at 110-200° C. for 2-12 h, and calcinating at 400-900° C. for 2-8 h to obtain an inorganic carrier;

2) adding to the inorganic carrier obtained in Step 1) a modification reagent in an amount which is 0.5-20% of the weight of the inorganic carrier, and reacting at 10-120° C. to connect new functional groups on the surface of the inorganic carrier through chemical bonds to obtain a surface-modified inorganic carrier; and 3) loading the VIB metal elements and the VIIIB metal elements on the surface-modified inorganic carrier, obtained in Step 2), by using an impregnation method, and then fully drying at 60-120° C. to obtain the hydrocracking catalyst.

The weight ratio of the pseudo-boehmite, amorphous silica alumina and molecular sieve used in Step 1) is (20-80):(20-60):(1-20).

The amount of the acid solution used is 0.5-10% of the total weight of the pseudo-boehmite, the amorphous silica alumina and the molecular sieve, and the concentration of the acid solution is no more than 10 wt %; wherein the acid solution includes nitric acid, phosphoric acid, hydrochloric acid, sulfuric acid and other inorganic acids, or formic acid, acetic acid, oxalic acid, citric acid and other organic acids.

In Step 2), the modification reagent contains two or more functional groups that can react with each other. One of the functional groups needs to be able to react with the surface of the inorganic carrier, and the functional group can be a hydroxyl group, a carboxyl group, an amino group, anhydride, a halogen substituent (such as —Cl, —Br, and —I), a siloxy group, a phosphate group, a metaphosphate group or a phosphite group. The other functional group needs to be able to react with oxides or salts containing VIB metal elements or VIIB metal elements, and the functional group can be a hydroxyl group, a carboxyl group, an amino group, as mercapto group, an amide group or a halogen substituent.

In Step 3), the loading amount of the VIB metal elements on the inorganic carrier is 5-30%, and the loading amount of the VIIIB metal elements on the inorganic carrier is 1-45%.

The significant advantage of the invention lies in that the invention modifies amino, hydroxyl, sulfhydryl, carboxylic acid groups and other groups on the surface of the inorganic carrier through chemical bonds, so that the obtained catalyst has a higher diesel liquid yield.

DETAILED DESCRIPTION OF THE INVENTION

In order to make the content of the invention more understandable, the technical solution of the invention is further described below in conjunction with specific embodiments, but the invention is not limited thereto.

The molecular sieve used is an ultra-stable Y molecular sieve raw material with a Si/Al ratio (molar ratio) of 30, a unit cell size of 24.31, and a framework Al/non-framework Al ratio ($^{27}$Al NMR method) of 3.6.

The pseudo-boehmite used has a specific surface area (BET method) of 234 m$^2$/g, the average pore diameter (BJH method) of 6.7 nm, the single-point adsorption pore volume of 0.65 cc/g, and the Na$_2$O content (weight percentage) of less than 0.1%.

The amorphous silica aluminum cased has the silicon content of 40% and the single point adsorption pore volume (BET) of 1.56 cc/g.

EXAMPLE 1

220 g of pseudo-boehmite (dry basis, all raw materials below are on dry basis unless otherwise specified), 160 g of amorphous silica alumina and 20 g of molecular sieve were weighed, these three solid powders were then mixed thoroughly, a pre-prepared dilute nitric acid solution (6.6 g, 67 wt % concentrated nitric acid diluted with 400 g deionized water) was added to the mixed powder, the resulting mixture was kneaded vigorously for 15 min and extruded into strips through a 2.5 mm perforated plate, and the stripes were dried at 120° C. for 8 h and then calcined in the 500° C. air atmosphere for 4 h to obtain an inorganic carrier Z0.

EXAMPLE 2

7.2 g of 3-phosphonopropionic acid was weighed and added to 70 mL of 95% ethanol solution, and the resulting solution was stirred at room temperature for 20 min so that the 3-phosphonopropionic acid was fully dissolved. Then, 40 g of the carrier Z0 prepared in Example 1 was added to the above solution, and the solution was rested to react at room temperature for 12 h, and then heated to 70° C. to react for 3 h. After the reaction, the excess ethanol solution was poured out, the obtained solid particles were rinsed 3 times with 40 mL of absolute ethanol at room temperature, and then pre-dried at 70° C. for 1 h in an air atmosphere, and then fully dried in a vacuum drying oven at 70° C. to obtain a surface-modified carrier Z1.

EXAMPLE 3

6.4 g of 3-aminopropane-1-phosphoric acid was weighed and added to 70 mL of 95% ethanol solution, and the resulting solution was stirred at room temperature for 20 min so that the 3-aminopropane-1-phosphoric acid was fully dissolved. Then, 40 g of the carrier Z0 prepared in Example 1 was added to the above solution; the reaction vessel was purged with nitrogen and the nitrogen atmosphere was maintained at a slight positive pressure; the solution was rested to react at room temperature for 12 h, and then heated to 60° C. to further react for 3 h. After the reaction, the excess ethanol solution was poured out, the obtained solid particles were rinsed 3 times with 40 mL of absolute ethanol at room temperature, and then pre-dried at room temperature for 4 h in an air atmosphere, and then fully dried in a vacuum drying oven at 70° C. to obtain a surface-modified carrier Z2.

EXAMPLE 4

5.5 g of 3-mercaptopropyl triethoxysilane was weighed and added to 80 mL of 95% ethanol solution, and the resulting solution was stirred at room temperature for 20 min so that the 3-mercaptopropyl triethoxysilane was fully dissolved. Then, 40 g of the carrier Z0 prepared in Example 1 was added to the above solution, and the solution was rested to react at room temperature for 8 h, and then heated to 80° C. to react for 4 h. After the reaction, the excess ethanol solution was poured out, the obtained solid particles were rinsed 3 times with 40 mL of absolute ethanol at room temperature, and then pre-dried at 70° C. for 1 h in an air atmosphere, and then fully dried in a vacuum drying oven at 70° C. to obtain a surface-modified carrier Z3.

EXAMPLE 5

5.4 g of 3-aminopropyltriethoxysilane was weighed and added to 80 mL of 95% ethanol solution, and the resulting solution was stirred at room temperature for 20 min so that the 3-aminopropane-1-phosphoric acid was fully dissolved. Then, 40 g of the carrier Z0 prepared in Example 1 was added to the above solution; the reaction vessel was purged with nitrogen and the nitrogen atmosphere was maintained at a slight positive pressure; the solution was rested to react at room temperature for 8 h, and then heated to 60° C. to further react for 4 h. After the reaction, the excess ethanol solution was poured out, the obtained solid particles were rinsed 3 times with 40 mL of absolute ethanol at room temperature, and then pre-dried at room temperature for 4 h in an air atmosphere, and then fully dried in a vacuum drying oven at 70° C. to obtain a surface-modified carrier Z4.

The properties of the carriers obtained in Examples 1-5 are shown in Table 1.

TABLE 1

| | The properties of the carriers obtained in Examples 1-5 | | | |
|---|---|---|---|---|
| Carrier | Surface functional group of carrie | Specific surface area of carrier (m$^2$/g) | Individual adsorption pore volume (cc/g) | Average adsorption pore size (nm) |
| Z0 | —OH | 395.2 | 0.771 | 7.39 |
| Z1 | —COOH | 374.3 | 0.646 | 6.30 |
| Z2 | —NH$_2$ | 365.7 | 0.679 | 6.54 |
| Z3 | —SH | 372.4 | 0.663 | 6.38 |
| Z4 | —NH$_2$ | 360.5 | 0.657 | 6.39 |

EXAMPLE 6: PREPARATION OF HYDROCRACKING CATALYST

The carriers prepared in Examples 1-5 were fully dried and sampled to test their water absorption. Then, the carriers were respectively impregnated in the mixed aqueous solution of ammonium metatungstate and nickel nitrate in equal volume so that the carriers were loaded with 18% of W and 5.4% of Ni (theoretical weight), and then dried and calcined in an air atmosphere at 500° C. for 4 h. The resulting catalysts were denoted as C0, C1, C2, C3, and C4, respectively.

EXAMPLE 7: HYDROCRACKING REACTION OF WAX OIL

The hydrocracking cycle oil was used as the wax oil raw material, and its density was 0.923 g/ml. In the raw material, the nitrogen content was 2.1 ppmw and the sulfur content was 23 ppmw. Its distillation range distribution is shown in Table 2.

TABLE 2

| Distillation range distribution | |
|---|---|
| Distillation range distribution | Weight percentage, wt % |
| IBP-170° C. | 0 |
| 170-280° C. | 2.3 |
| 280-371° C. | 12.3 |
| 371-500° C. | 78.3 |
| >500° C. | 7.1 |

The hydrocracking unit adopted a one-pass hydrogenation process, and the unit was mainly composed of gas feed, liquid feed, hydrogenation reaction, gas-liquid separation and product collection. The unit was equipped with a single reactor filled with a hydrocracking catalyst and adopted a 5-stage electric furnace for heating. The reaction effluent entered a high-pressure separator and a low-pressure separator tank for gas-liquid separation. The high-fraction hydrogen-rich gas was separated by the separation tank, and the water cooling for the jacket and corresponding technical measures were adopted to allow the ammonium salt to crystallize and settle, thus preventing the downstream pipelines and equipment from being blocked. The low-pressure tail gas after the pressure control valve was measured with a gas flow meter and its composition was analyzed by online chromatography. The distillation range of the liquid product was analyzed offline.

The hydrocracking reaction was carried out under the hydrogen pressure of 15 MPa with the hydrogen flow rate of 832 mL·min$^{-1}$ and the raw material feed rate of 70 mL·h$^{-1}$, wherein the hydrocracking catalyst was filled in 14 cm$^{-3}$ and diluted with quartz sand to 4 times of the original volume. The test results of the prepared catalysts are shown in Table 3.

TABLE 3

| Test results of catalysts | | | | | |
|---|---|---|---|---|---|
| | \he nature and performance of the catalyst: | | | | |
| | C0 | C1 | C2 | C3 | C4 |
| Before metal loading | | | | | |
| Carrier | Z0 | Z1 | Z2 | Z3 | Z4 |
| Surface functional | —OH | —COOH | —NH$_2$ | —SH | —NH$_2$ |
| After metal impregnation | | | | | |
| W, wt % | 17.8 | 17.6 | 18.1 | 18.0 | 17.5 |
| Ni, wt % | 5.4 | 5.7 | 5.4 | 5.2 | 5.6 |
| Specific suface area m$^2$/g | 252.8 | 249.6 | 258.7 | 247.3 | 247.0 |
| Catalyst activity, (when the conversion rate of the component reaches 65% at 371° C. or above) | 372 | 369 | 370 | 371 | 371 |
| Product selectivity, (when the conversion rate of the component reaches 65% at 371° C. or above) | | | | | |
| Gaseous product (C1-C4) | 2.9% | 3.2% | 3.1% | 2.4% | 2.3% |
| Naphtha (C5-170° C.) | 32.4% | 32.3% | 32.2% | 29.9% | 29.6 |
| Diesel (170-371° C.) | 64.7% | 64.5% | 64.7% | 66.7% | 68.1 |

The results show that, compared with the catalyst C0 prepared from the inorganic carrier Z0, the catalysts C1 and C2 obtained by replacing the surface functional groups of the inorganic carrier Z0 with carboxyl and amino groups are increased in the reaction activity by 2-3° C., but do not change significantly in the product selectivity. This is because although the performance of the metal center is improved after the functional group is replaced, the P element is introduced into the catalyst carrier and enhances the acidity of the carrier, thus improving the cracking performance of the catalyst. Therefore, the overall performance of the catalyst is improved in catalyst activity while maintaining the selectivity of various products.

The catalyst activity of the catalysts C3 and C4 prepared by introducing mercapto and amino groups into the surface of the inorganic carrier Z0 by organosiloxane is slightly improved, but the product selectivity has changed significantly. Among them, the selectivity of the gaseous product and naphtha product of the catalyst C3 is decreased by 2%, and the corresponding diesel selectivity is increased by 2%; similar phenomena are also observed in the hydrocracking reaction using the catalyst C4, but the diesel yield is increased more significantly, reaching 3.4%. The reason is that different functional groups are introduced into the carriers of the catalysts C3 and C4 through organosiloxane, which significantly improves the metal performance. However, the introduction of Si element does not enhance the acidity of the carrier as much as P element, so the overall performance of the catalyst is slightly improved. But diesel selectivity has increased significantly.

The above experiments prove that the introduction of new functional groups through the modification of the carrier surface weakens the strong interaction between the transition metal and the carrier surface, and does help the sulfidation of the transition metal to improve the hydrogenation/dehydrogenation performance of the metal center.

The above description is only the preferred embodiments of the invention, and all equivalent changes and modifications made within the scope of the patent application of the invention should fall within the scope of the invention.

What is claimed is:

1. A preparation method of a hydrocracking catalyst, comprising the following Steps: 1) mixing pseudo-boehmite, amorphous silica-alumina and a molecular sieve in a certain proportion, adding a certain amount of acid solution, kneading for 2-60 min, and then extruding and molding into strips; the strips are prepared by drying and calcining to obtain an inorganic carrier; 2) adding to the inorganic carrier obtained in Step 1) a modification reagent in an amount which is 0.5-20% of the weight of the inorganic carrier, and reacting at 10-120° C. to connect new functional groups on the surface of the inorganic carrier to obtain a surface-modified inorganic carrier; and 3) loading VIB metal elements and VIIIB metal elements on the surface-modified inorganic carrier, obtained in Step 2), by using an impregnation method, and then drying at 60-120° C. to obtain the hydrocracking catalyst.

2. The preparation method of a hydrocracking catalyst according to claim 1, wherein the weight ratio of the pseudo-boehmite, amorphous silica: alumina and molecular sieve used in Step 1) is (20-80):(20-60):(1-20).

3. The preparation method of a hydrocracking catalyst according to claim 1, wherein the amount of the acid solution used in Step 1) is 0.5-10% of the total weight of the pseudo-boehmite, the amorphous silica alumina and the molecular sieve, and the concentration of the acid solution is no more than 10 wt %; wherein the acid solution is an inorganic acid or an organic acid.

4. The preparation method of a hydrocracking catalyst according to claim 1, wherein the modification reagent in Step 2) contains two or more functional groups; one of the functional group needs to be able to react with the surface of the inorganic carrier, and the other functional group needs to be able to react with oxides or salts containing VIB metal elements or VIIIB metal elements.

5. The preparation method of a hydrocracking catalyst according to claim 4, wherein the functional group which is able to react with the surface of the inorganic carrier includes any one of a hydroxyl group, a carboxyl group, anhydride, an amino group, a halogen substituent, a siloxy group, a phosphate group, a metaphosphate group, and a phosphite group.

6. The preparation method of a hydrocracking catalyst according to claim 4, wherein the functional group which is able to react with oxides or salts containing VIB metal elements or VIIIB metal elements include any one of a hydroxyl group, a carboxyl group, an amino group, a sulfhydryl group, an amide group, and a halogen substituent.

7. The preparation method of a hydrocracking catalyst according to claim 1, wherein in Step 3), the loading amount of the VIB metal element on the surface-modified inorganic carrier is 5-30 wt %, and the loading amount of the VIIIB metal element on the surface-modified inorganic carrier is 1-15 wt %.

* * * * *